July 25, 1961 G. O. McCLENDON 2,993,386
MEANS FOR AND METHOD OF BALANCING ROTATABLE OBJECTS
Filed Sept. 26, 1958

INVENTOR.
Gerald O. McClendon
BY
Fred C. Matheny
ATTORNEY

United States Patent Office 2,993,386
Patented July 25, 1961

2,993,386
MEANS FOR AND METHOD OF BALANCING ROTATABLE OBJECTS
Gerald O. McClendon, 17207 8th Ave., NE., Seattle 55, Wash.
Filed Sept. 26, 1958, Ser. No. 763,583
8 Claims. (Cl. 74—573)

My invention relates to means for and a method of balancing rotatable objects, particularly brake drums of motor vehicle wheels, and an object of my invention is to provide an improved means and method which makes it both possible and practical to correctly and accurately balance motor vehicle brake drums independently of the wheels which are usually bolted to these drums.

Applicant has found that commonly used motor vehicle brake drums, in themselves, are seldom balanced properly for high speed rotation.

The desirability of having motor vehicle wheel assemblies accurately balanced so they will not vibrate when in use is generally recognized. The part herein referred to as a wheel comprises a web and a rim with a tire mounted thereon. The balance of such a wheel is usually affected by changing the position of a tire on the rim, rotatively considered, or exchanging one tire for another on the rim. If a tire is removed from a rim for repair it is usually put back in its initial position on the same rim to avoid disturbing balance. Putting a new or different tire on a rim usually necessitates a new balancing of the wheel.

In balancing a wheel it is common practice to attach the wheel composed of the web rim and tire to the brake drum and then balance this assembled wheel structure either on the vehicle or with the entire wheel assembly removed from the vehicle and applied to a balancing machine. When an assembled wheel, including an unbalanced drum, has been balanced in this manner and the web, rim and tire part is removed from the unbalanced drum and replaced in a different angular position on the same drum or applied to a different drum the resulting wheel assembly will almost always be out of balance.

When a wheel, composed of the web, rim and tire part, is to be replaced on the same drum on which it has been properly balanced the balance can be preserved by marking the wheel and drum, retaining the same tire in the same position on the rim, and replacing the wheel in its previously balanced position on the drum. However, this method can not well be followed when switching wheels on a vehicle in the interest of obtaining maximum tire wear and it usually is not followed when emergency wheel changes are made on account of flat tires.

The result of using unbalanced brake drums and balancing the entire wheel assembly is that a new balancing of each wheel assembly is required whenever a wheel is changed from one brake drum to another or is replaced in a different position on a drum from which it has been removed.

A wheel consisting of a web, rim and tire can be properly balanced on the balancing machines now in common use, either directly, without attaching it to a brake drum or by balancing it while it is attached to a properly balanced brake drum. The use of properly balanced brake drums on a vehicle results in proper balancing of all wheels which are balanced on those drums and this can include the spare or spares. Such balancing renders these wheels interchangeable and capable of use on any other balanced drum without resulting in unbalance. This insures greater safety in driving and a saving in time and expense incidental to repeated wheel balancing operations.

It is an object of my invention to provide a novel and efficient balancing weight especially well adapted for use in balancing brake drums.

Another object is to provide a balancing weight of magnetized ferrous metal which can be manually adjusted over a vertical face of a brake drum or like object to be balanced and which will hold itself in any position on the object into which it is adjusted.

Another object is to provide a flat balancing weight having a magnetized metal part which will magnetically hold the balancing weight in a fixed position on a ferrous metal object and having another metal part which is very easily drilled for the reception of securing means by which the balancing weight is permanently attached to the object.

Another object is to provide a flat balancing weight having therein at least one perforation containing soft easily melted insert metal which can readily be drilled out and replaced by a securing device, such as a rivet, screw or bolt of substantially the same unit weight as the drilled out metal to fasten the balancing weight to a brake drum, or which insert metal will melt out and compensate for the added weight of metal used in welding in the event the balancing weight is fastened to a brake drum or like part by welding.

Other objects of the invention will be apparent from the following description taken in connection with the accompanying drawings.

In the drawings FIGURE 1 is an elevation of a circular balancing weight made in accordance with my invention and having near its periphery two perforations containing soft insert metal.

Like reference numerals refer to like parts throughout the several views.

In carrying out my invention I provide thin flat balancing weights of various shapes and sizes. Four different types of these weights are shown for illustrative purposes and it will be understood that the size and shape of these weights may be widely varied.

Figure 1:
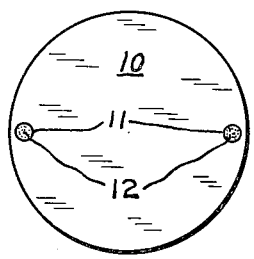

FIG. 1 shows a flat circular weight 10 of preferably magnetized ferrous metal having two perforations 11 positioned near its periphery. The perforations 11 are initially filled, or at least partially filled, with insert metal 12 which is soft or low in the scale of hardness and has a low melting point. Solder, lead or many of the numerous lead alloys can be used as insert metal. The object of using this insert metal is to provide an insert which can be quickly and easily drilled out without displacing the balancing weight on an object to which it is to be secured or which will be melted and caused to run out of its perforation in the event the balancing weight is subjected to the heat incident to welding it to a brake drum or like object. In this connection it should be borne in mind that magnetized metal is necessarily very hard and difficult to drill, that the perforations 11 can be made before the member 10 is tempered and magnetized and that the insert metal is very soft and easily drilled and compensates for the weight of the part of a securing device left in the perforation if rivets are used.

Figure 2:
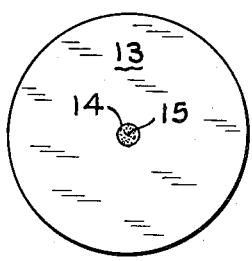
FIG. 2 is an elevation of another circular balancing weight having a central perforation containing soft insert metal.

FIG. 2 shows a flat, preferably magnetized, balancing weight 13 of hard ferrous metal similar to the weight 10 shown in FIG. 1 except that it has a single centrally positioned perforation 14 containing soft and readily meltable insert metal 15. The insert metal 15 in the axial perforation 14 is not as easily melted by peripherally applied welding heat as it would be if it were located near the periphery of the balancing weight 13 but it can be melted out. The perforation 14 is preferably of larger diameter than the perforations 11 so it will hold enough insert metal to compensate for added welding metal if a welding process is used to attach the balancing weight 13 to an object.

Figure 3:
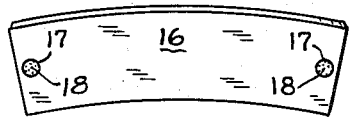
FIG. 3 is a perspective view of an elongated balancing weight having a perforation near each end thereof containing soft insert metal.

FIG. 3 shows an elongated preferably slightly curved magnetized balancing weight 16 of hard ferrous metal and of generally rectangular shape. This weight 16 is provided near its respective ends with perforations 17 having therein soft readily meltable insert metal 18.

Figure 6:
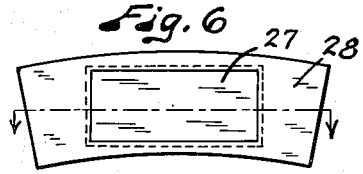
FIG. 6 is an elevational view of a balancing weight of modified form made in accordance with my invention.
Figure 7:
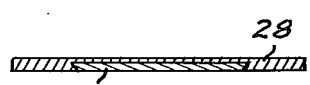
FIG. 7 is a sectional view taken substantially on broken line 7—7 of FIG. 6.

FIGS. 6 and 7 show a balancing weight capable of being secured to a brake drum or like object by rivets or similar fastening devices but not adapted to be subjected to welding heat. This balancing weight of FIGS. 6 and 7 comprises a thin flat part 27 of hard magnetized ferrous metal attached to another part 28 of soft readily drilled metal. The part 28 may be lead or a lead alloy. One way of constructing this weight is to imbed the magnetized part 27 in the softer metal part 28 in the process of casting or molding the weight, leaving at least one face of the magnetized part 27 exposed for contact with the brake drum or object being balanced. Parts of the soft metal 28 protrude beyond at least some of the edges of the hard metal part 27 far enough so that holes for the reception of rivets or similar securing devices can be easily drilled therein. Such holes can be drilled in the end portions of the soft metal part 28 shown in FIGS. 6 and 7. Obviously the magnetic part and the soft metal part of a balancing weight similar to the one shown in FIGS. 6 and 7 can be attached together or made into a one piece balancing weight in various different ways and their shape and relative size can be widely varied. Also more than one magnetic part can be embodied in a single unitary balancing weight of this type if desired.

Figure 4:
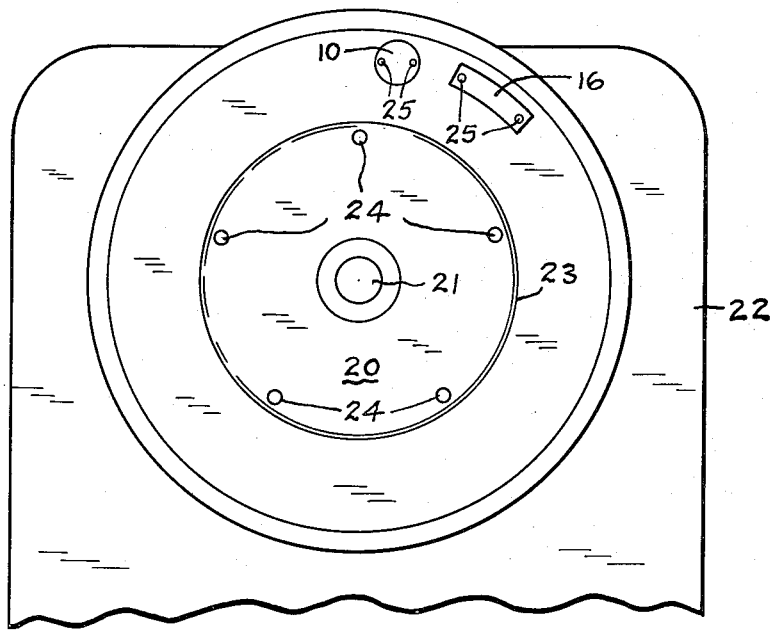
FIG. 4 is an elevation showing a brake drum mounted on a balancing machine and showing two of my balancing weights secured on the face of said brake drum.

My balancing weights can be attached to a brake drum 20 by supporting said drum 20 on a horizontal shaft 21 of a balancing machine 22 so that any static unbalance of the drum will be manifested in the usual manner by gravity actuated angular movement of the drum. Usually the marginal portion of a brake drum, such as the portion outwardly from a shoulder indicated by the circle 23 in FIG. 4, is inwardly offset from the central portion of the drum face from which the wheel attaching bolts 24 protrude. This provides some clearance for attachment of the balancing weights near the periphery of the brake drum. Also the web portions of wheels at a greater radial distance than the circle 23 on the drum 20, FIG. 4, are usually curved outwardly away from the plane of the face of the drum thus providing additional clearance.

With a brake drum 20 supported as shown in FIG. 4 a selected balancing weight is placed on the upright face of the drum near the periphery and adjustably moved manually until the drum is statically balanced to such an extent that it will not tend to rotate or angularly move away from any position in which it is brought to rest. If one balancing weight does not provide correct balance then more than one weight may be used. The magnetism of each balancing weight will always hold it in any position into which it is adjusted on the face of the brake drum. After correct balance of the drum is attained by applying to it and adjusting on it one or more of my magnetized balancing weights the operator may either permanently secure the correctly positioned magnetized balancing weight or weights to the drum or he may mark the position of each magnetized balancing weight, remove the magnetized weight and attach an equivalent non-magnetized balancing weight in the marked position.

Preferably I provide sets of these non-magnetized balancing weights, which are duplicates in weight, size and shape of the magnetized balancing weights and can be used in connection with the magnetized balancing weights and are less expensive than the magnetized balancing weights. If non-magnetized weights are to be used their correct positions on the drum 20 are determined by the use of the magnetized weights, these positions are marked, the magnetized balancing weights are removed, the equivalent non-magnetized balancing weights are held against the drum in the correct marked positions and are secured to the drum by either the drilling or the welding method.

Figure 5:
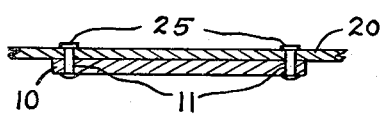
FIG. 5 is a sectional view through one of my balancing weights and a fragment of a brake drum to which said weight is secured by rivets.

In securing the magnetized balancing weights 10, 13 or 16 to the drum 20 by the use of attaching devices, such as the rivets 25 shown in FIG. 5, the operator, by using an electric drill in one hand and placing the other hand on the balancing weight, can easily drill out the insert metal 12, 15 or 18 and can drill through the adjacent face of the brake drum 20 without disturbing the position of the magnetized balancing weight on said drum. The removed insert metal and drillings removed from the drum 20 will compensate for the added weight of the rivet, bolt or screw if a drilling method is used in permanently attaching the magnetized balancing weight to the drum. The balancing weight shown in FIGS. 6 and 7 can be attached in a similar manner by drilling through the end portions of the soft metal part 28 and through the adjacent part of the brake drum. The balancing weights 10, 13 and 16 can be welded to the brake drum and in the welding process the insert metal will melt out and the melted out insert metal will offset the added weight of welding rod used in the welding process. Thus the permanent fastening of the balancing weights will not result in any substantial change in the actual weight of the counter-balancing parts due to drilling or welding.

The foregoing description and accompanying drawings clearly disclose preferred embodiments of my invention but it will be understood that changes may be made within the scope of the following claims.

I claim:

1. Balancing means for a rotatable ferrous metal object, comprising a flat balancing weight of relatively hard metal having at least one transverse perforation therein; and insert metal of substantially less hardness and of a lower melting point than the object and the balancing weight disposed in said perforation, said insert metal being easily drilled and easily melted thereby facilitating the attachment of said balancing weight to a ferrous metal object without substantially changing the weight of said balancing weight.

2. A balancing weight for use on a brake drum, comprising a flat piece of relatively hard metal having therein at least one transverse perforation capable of receiving an attaching device by which the piece of metal is attached to a brake drum; relatively soft insert metal in said perforation capable of being readily drilled out of the perforation; and an attaching device capable of being inserted in the perforation, the specific gravity of the insert metal and the attaching device being approximately equal, whereby the added weight of the attaching device will be compensated for by the removed weight of the insert metal in attaching the piece of metal to the brake drum.

3. Balancing means for a ferrous metal object which is rotatively supported and has a substantially vertical face, comprising a flat magnetized ferrous metal balancing weight capable of magnetically holding itself immovable on the vertical face of the object while remaining manually adjustable on the object into a position of static balance, said balancing weight having at least one transverse perforation therein; soft insert metal in said perforation capable of being easily drilled out while the weight is magnetically held immovable on the object; and attaching means of substantially the same specific gravity as the insert metal capable of extending through the perforation and permanently attaching the balancing weight to the object after the insert metal is drilled out of the perforation, the removed insert metal compensating for the added weight of the attaching means.

4. Balancing means for a brake drum which is rotatively supported with its outer face substantially vertical, comprising a flat magnetized ferrous metal balancing weight of greater length than width capable of magnetically holding itself immovable on the vertical face of said brake drum while remaining manually adjustable on said drum, said balancing weight having a transverse perforation adjacent each end thereof; soft insert metal in each of said perforations capable of being easily drilled out of the perforation while the balancing weight is magnetically held immovable on the drum; and attaching devices each of substantially the same unit weight as the insert metal capable of extending through the respective perforations and cooperating in permanently attaching the balancing weight to the drum after the insert metal is drilled out of the perforations, the insert metal removed from each perforation compensating for the added weight of the part of an attaching device within the perforation.

5. The method of balancing a ferrous metal brake drum, which comprises supporting the drum on a horizontal axis with the drum free to move angularly by gravity and with a face of the drum substantially vertical; applying to the vertical face of the drum a magnetized weight capable of magnetically maintaining a fixed position on the drum while remaining manually adjustable thereon; adjusting the magnetized weight on the face of the drum into a position of static balance of the drum and magnetized weight; and permanently attaching the magnetized weight to the drum in the statically balanced position thereof.

6. The method of balancing a ferrous metal brake drum, which comprises supporting the drum on a horizontal axis with the drum free to move rotatively by gravity and with a face of the drum substantially vertical; applying to the vertical face of the drum a magnetized balancing weight capable of magnetically maintaining a fixed position on the drum while remaining manually adjustable on said drum; adjusting the magnetized weight on the face of the drum into a position of static balance; replacing the magnetized balancing weight with a non-magnetized balancing weight of the same size and shape and weight; and permanently securing the non-magnetized balancing weight to the drum in the position of static balance determined by the magnetized balancing weight.

7. A balancing weight for a ferrous metal object comprising a magnetized part capable of magnetically holding the balancing weight in an adjusted position on the object; and a soft metal part attached to the magnetized part and extending beyond the edges of the magnetized part a sufficient distance to receive therein drill holes and rivets outwardly from and clear of the magnetized part with the rivets securing the weight to the object.

8. A balancing weight for a rotatively supported brake drum, comprising a thin flat part of soft readily drilled metal; and a thin flat part of magnetized hard metal embedded in said soft metal part and having at least one exposed face adapted to be positioned against a brake drum, said magnetized part being capable of holding the balancing weight in adjusted positions on a brake drum, the soft metal part extending beyond at least some of the edges of the magnetized part a sufficient distance to receive therein drill holes and rivets which are clear of the magnetized part.

References Cited in the file of this patent

UNITED STATES PATENTS

| | | |
|---|---|---|
| 1,800,883 | Booth | Apr. 14, 1931 |
| 2,029,561 | Du Sang | Feb. 4, 1936 |
| 2,245,355 | Mullen | June 10, 1941 |
| 2,558,737 | Darnell | July 3, 1951 |

FOREIGN PATENTS

| | | |
|---|---|---|
| 294,103 | Switzerland | Jan. 4, 1954 |